(12) United States Patent
Sobol

(10) Patent No.: US 7,081,968 B1
(45) Date of Patent: Jul. 25, 2006

(54) DEVICE FOR THE GENERATION AND USE OF MULTI-LAYERED TEXT

(75) Inventor: Idan Sobol, Tel Aviv (IL)

(73) Assignee: Multitext Ltd., Tel-Aviv (IL)

( * ) Notice: Subject to any disclaimer, the term of this patent is extended or adjusted under 35 U.S.C. 154(b) by 0 days.

(21) Appl. No.: 09/529,348

(22) PCT Filed: Aug. 24, 1998

(86) PCT No.: PCT/IL98/00403

§ 371 (c)(1),
(2), (4) Date: Jun. 7, 2000

(87) PCT Pub. No.: WO99/19813

PCT Pub. Date: Apr. 22, 1999

(30) Foreign Application Priority Data

Oct. 15, 1997 (IL) ........................ 121990
May 21, 1998 (IL) ........................ 124579

(51) Int. Cl.
*G06F 15/00* (2006.01)
(52) U.S. Cl. .................. 358/1.16; 358/1.18; 358/1.15; 707/203; 707/204
(58) Field of Classification Search .............. 358/1.18, 358/1.16, 1.15, 1.9; 707/203, 204, 530, 531, 707/540, 575; 705/55, 13, 20, 22
See application file for complete search history.

(56) References Cited

U.S. PATENT DOCUMENTS

| | | | |
|---|---|---|---|
| 4,071,909 A * | 1/1978 | Geller | 710/72 |
| 5,101,345 A | 3/1992 | MacPhail | |
| 5,317,729 A * | 5/1994 | Mukherjee et al. | 707/3 |
| 5,357,631 A | 10/1994 | Howell et al. | 395/600 |
| 5,495,565 A | 2/1996 | Millard et al. | 715/506 |
| 5,561,746 A | 10/1996 | Murata et al. | 345/419 |
| 5,647,018 A | 7/1997 | Benjamin | |

FOREIGN PATENT DOCUMENTS

| | | |
|---|---|---|
| EP | 0 230 616 | 8/1987 |
| EP | 0 483 039 | 4/1992 |

* cited by examiner

*Primary Examiner*—Twyler M. Lamb
(74) *Attorney, Agent, or Firm*—Nath & Association Pllc; Gary M. Nath; Gregory B. Kang

(57) ABSTRACT

A computer-implemented method for producing a multi-layer text, including: providing a text, selecting a value of a text dimension to the text segment, wherein a text dimension refers to any desired domain and includes information on one related text layer. The method further includes: repeating the specified operations as many times as desired.

21 Claims, 1 Drawing Sheet

DEVICE FOR THE GENERATION AND USE OF MULTI-LAYERED TEXT

FIELD OF THE INVENTION

The present invention is in the general field of text manipulation.

BACKGROUND OF THE INVENTION

Texts displayed for reading by means of currently available techniques are "flat" texts. In other words, any alteration in the text involves deleting a letter, word, sentence or paragraph and replacing them with a different letter, word, sentence or paragraph, or adding text and integrating it into the basic text. As a result, the display or printing of the result constitutes effectively, a new text. The displayed or printed result does not preserve or reflect the change and development of the basic text.

In many application is, it is desired to reflect information expressed in several dimensions, e.g. the text that is relevant to specific date or period. Typical example being the law text. The Law undergoes revisions from time to time, and an advocate involved in a lawsuit that refers to events that had occurred at a given period in the past should, preferably, have a convenient means for reviewing the language of the law and regulations that were relevant to the specific dates under consideration. The advocate is not interested in later revisions. In other words, the user or advocate would like to have a convenient means for displaying a given "layer" of the text which is of interest.

As will be explained in greater detail below, whilst the example above illustrated selection of layer of interest according to time dimension, (i.e. displaying a layer of text which is valid for a given time), other dimensions may be of interest either separately or in combination, e.g. displaying in parliament records, only the text layer that relates to a given spokesperson.

There is, accordingly, a need in the art for providing a convenient means for introducing and displaying layers of text according to selected dimension or dimensions.

Glossary:

There follows a glossary of terms that are used in the specification, some of which are conventional and others have been coined.

Dimension—A variable applied to a text segment, which includes information on one related level. The dimensions are not limited in definition, quantity or number of assigned values per text segment. An unlimited number of dimensions and values can be defined, meaning that the dimension will serve a great number of terms. The dimensions do not have to be defined for every text segment. A text segment that has no defined dimension will be a non-dimensional text segment.

There follows typical, yet not exclusive, types of dimensions:

A. Dimension of time—the variable that defines the validity in time of a given text segment.
B. 25 Dimension of place—the variable that defines the place where the text was created, occurred, is relevant to, etc.
C. Spokesperson dimension—the variable that defines the text of a given spokesperson.
D. Reference Dimension: a variable that defines the source of text and serves as reference to the text segment under question. Thus, for example, when a given text segment in a patent document originates from a given scientific publication (e.g. a publication from the IEEE gazette), the reference dimension that is applied to the text segment in the patent is assigned with the value of the specified scientific publication.

Those versed in the art will readily appreciate that the dimension is by no means bound by the latter examples and, in fact, dimension may refer to any desired domain of subject. Thus, by way of non-limiting example, in a play script, a dimension may refer to passages with, say, tragic (first value) or comic (second value) connotations.

As will be explained in greater detail below, different dimensions may refer to the same text segment.

It should be noted that the dimension and value thereof do not necessarily form an integral part of the text. Thus, for example, the text segment, "inner-city fare is 200 shekels", may be assigned with the value, "Tel Aviv" of the place dimension, without that value being part of the text segment.

A text segment may vary from the smallest unit (i.e. word), to any defined text portion (e.g. sentence, a few words, paragraph, etc). It should be noted that a text segment is not confined to any particular linguistic syntax structure.

2. Dimension Value—A quantitative value in the definition range that a dimension receives for a text segment, or in other words, the value of a given text.
3. Range of Values—The range of values that a dimension may receive. This is of particular relevance to text retrieved.
4. Status of the dimension value—The status of the given value is either valid or invalid. Put differently, for various types of dimensions, there need not necessarily be a valid value.
5. Text segment—The text portion to which a dimension variable is assigned.
16. Text—Information that is saved in a given format, and is constructed of text segments.
7. Word—A chain of characters separated by dividers on both sides (valid dividers, punctuation marks or a space).
8. Type of value continuity—Defines the behavior of values in the dimension. The permitted types of continuity are as follows:

First type: There may and must only be one valid value that is assigned to a given dimension. The beginning time (say date) of the unit of a new value will cause the former value to close on the specified date minus 1. Time dimension is an example of a first type, seeing that applying an opening date to a segment necessarily entails that the previous text segment expired one day before. Of course, the time dimension is not bound to date and may refer to a different time unit say second, minute, decade etc.

Second type: There are various dimensions that may have either valid or invalid values.

Practically speaking, there are various functions that may be applied when editing a text so as to constitute a multi-layer text, including:

Insert—A function used to insert a text segment into a certain place in the text. This requires to assign dimensions and values to the newly inserted text segment.

End—End actually corresponds to "deletion" of text. The text is not actually deleted, but rather the dimension thereof is rendered invalid.

Author Correction—Enables to correct text (e.g. editorial errors) without affecting the dimension. In other words, the same value of a given dimension applies to the text before and after Author corrections were effected.

Those versed in the art will readily appreciate that the specified functions may be modified and/or others may be added, all as required an appropriate.

SUMMARY OF THE INVENTION

As specified before, according to prior art, text is displayed in a "flat" (i.e. single layer) form, and reflects the last update. According to the invention, text layering is accomplished by assigning the value of a desired dimension to a selected text segment. As defined above, "dimension"stands for e.g. time, spokesman etc. Thus, by way of example, a given text segment, say a passage in the law, is valid from Jan. 1, 1983 and expires on Dec. 31, 1992. In this example, the text dimension is the time dimension, and the period Jan. 1, 1983 to Dec. 31, 1992 stands for the value range of said time dimension.

Accordingly, the invention provides for a computer-implemented method of producing a multi-layer text, comprising
- (a) providing a text;
- (b) selecting a text segment;
- (c) assigning a value or value range of a text dimension to said text segment, wherein a text dimension refers to any desired domain and includes information on one related text layer;
- (d) repeating steps (b) and (c) as many times as desired.

The present invention further provides for a system that includes display unit for producing multi-layer text, comprising:
- (i) a selector for selecting a text segment in said text;
- (ii) an assignor for assigning a value of a text dimension to said text segment, wherein a text dimension refers to any desired domain and includes information on one related text layer; and
- (iii) memory for storing the multi-layer text.

As specified above, text dimension is selected from the group that includes e.g. time, place, spokesperson and reference dimension. Other dimensions may be used, all as required and appropriate.

If desired, after generating the multi-layer text, it may be displayed preferably (although not necessarily), in a manner where each different value of a given text dimension is displayed in unique manner, e.g. in a different color.

Accordingly, there is provided for use with a multi-layer text of the kind specified, a computer-implemented method for displaying a text of interest, comprising:
- (a) providing at least one input value or input value range of at least one text dimension; and
- (b) retrieving and displaying text segments having assigned thereto a value that meets said input value, or input value range.

BRIEF DESCRIPTION OF THE DRAWINGS

For a better understanding, the invention will now be described, by way of example only, with reference to the accompanying drawings, in which.

DETAILED DESCRIPTION OF A PREFERRED EMBODIMENT

Figure 1:
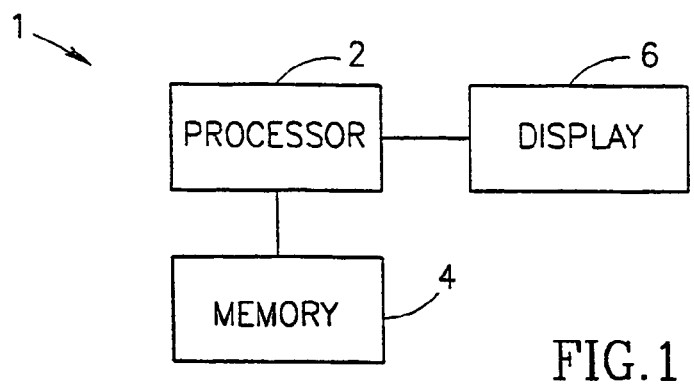
FIG. 1 illustrates a generalized block diagram of a system according to the invention.

Attention is first directed to FIG. 1, illustrating a generalized block diagram of a system according to the invention. As shown, the system (1) includes a processor (2) coupled to memory (4) and to display (6). The processor, memory and display may be any of commercially available devices, e.g. a conventional P.C. running an Intel® based processor, and running a Windows® based operating system. This is, of course, an example, and any architecture which provides one or more processors coupled to at least one display device and to at least one memory, is suitable for the invention. The processor is loaded from the memory with a suitable program and an input text for producing a multi-layer text according to the invention.

Figure 2:
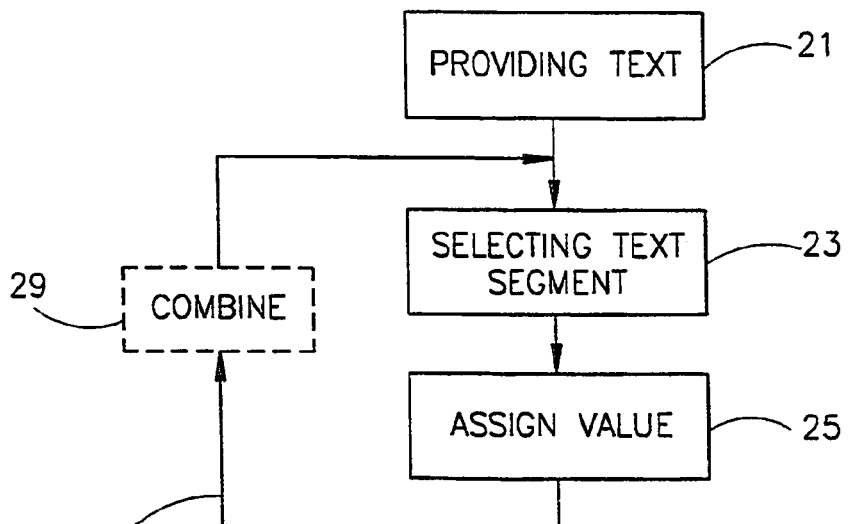
FIG. 2 illustrates a flow chart of a generalized sequence of operation for producing a multi-layer text according to one embodiment of the invention.

The generalized sequence of operation for producing the multi-layer text of the invention is illustrated in the flow chart of FIG. 2. which basically includes the following sequence:
- (a) providing a text (21);
- (b) selecting a text segment (23);
- (c) assigning value of a text dimension to said text segment (25);
- (d) repeating steps (b) and (c) as many times as desired (27,29).

There follows an example (Table I) which illustrates the resulting multi-layer text.

TABLE I

| No. | Text Segment | Dimen. Time Values | Dimen Place Values |
|---|---|---|---|
| 1 | Inner-city bus fare is | Begin-01.01.75 End-~ | Tel-Aviv London |
| 2 | Two lira | Begin-01.01.75 End-31.12.79 | Tel Aviv |
| 3 | Half pound | Begin-01.01.75 End-31.12.80 | London |
| 4 | One hundred | Begin-01.01.80 End-31.12.83 | Tel-Aviv |
| 5 | Two | Begin-01.01.81 End-31.12.89 | London |
| 6 | Half shequel | Begin-01.01.84 End-31.12.84 | Tel-Aviv |
| 7 | One hundred and fifty | Begin-01.01.85 End-31.12.86 | Tel-Aviv |
| 8 | 1.5 new | Begin-01.01.87 End-31.12.89 | Tel-Aviv |
| 9. | Three | Begin-01.01.90 End-~ | Tel Aviv London |

As shown in the specified example, only two dimension types are utilized. i.e. time dimension and place dimension.

TABLE II

| Time Dimensions | Dimension Place | Resulting Text |
|---|---|---|
| Begin-01.01.75 End-31.12.79 | Tel Aviv | Inner city bus fare is two lira |
| Begin-01.01.75 End-31.12.80 | London | Inner city bus fare is half pound |
| Begin-01.01.80 End-31.12.83 | Tel Aviv | Inner city bus fare is one hundred lira |
| Begin-01.01.81 End-31.12.89 | London | Inner city bus fare is two pounds |
| Begin-01.01.84 End-31.12.84 | Tel Aviv | Inner city bus fare is half a shequel |

TABLE II-continued

| Time Dimensions | Dimension Place | Resulting Text |
|---|---|---|
| Begin-01.01.85 End-31.12.86 | Tel Aviv | Inner city bus fare is one hundred and fifty shequels |
| Begin-01.01.87 End-31.12.89 | Tel Aviv | Inner city bus fare is 1.5 New Shequels |
| Begin-01.01.90 End-~ | Tel Aviv | Inner city bus fare is three New Shequels |
| Begin 01.01.90 End-~ | London | Inner city bus fare is three pounds |

Figure 3:
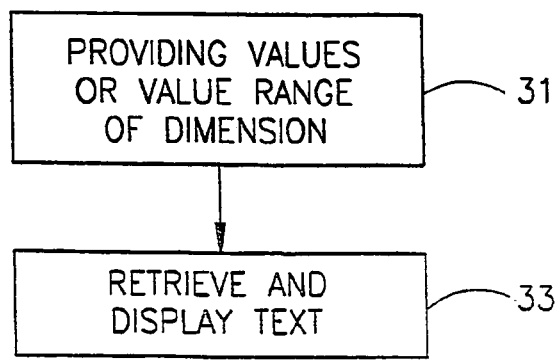
FIG. 3 illustrates a flow chart of a generalized sequence of operation for retrieving and displaying text of interest in a multi-level text of the invention.

Attention is now directed to FIG. 3 illustrating a flow chart of a generalized sequence of operation for retrieving and displaying (33) text of interest in a multi-layer text of the invention. As shown, the multi-layer text of the kind specified enables to retrieve and display a text of interest by, generally, following the steps:

(a) providing at least one input value, or input value range, of at least one dimension; and (b) retrieving and displaying text segments having assigned thereto each value or value range that meets said input value or input value range.

Considering, the example of Table II above, an illustrative query could be "How much does an inner-city bus ride cost on the date (03 10 1981) in a certain city"?

The relevant input values are, of course, 03 10 1981 (time dimension) and Tel Aviv or London (place dimension). What remains to be done is to retrieve the text segment that corresponds to the specified input values, i.e. two pound in London (since 03 10 1981 falls in the range of 01 01 1981–31.12.89) and one hundred lira in Tel-Aviv (since 03 10 falls in the range of 01 01 1980–31 12 1983).

As clearly shown in Table II, a text segment need not necessarily be assigned one value. Thus, in FIG. 2, the same text segment is associated with two values belonging to time and place dimensions, respectively.

There follows an example which will assist in clarifying the so called "second type" of continuity:

Thus, if there is a dimension that shouldn't have a value all the time, and it can have more than one value at a given time period, like employment for example (one is not always employed), then each validity period of any value should contain start and termination of validity, for example:

The next sentence is part of a text that has the employment dimension; the values are as follows:

| Text | validity begins | Validity terminates |
|---|---|---|
| I am | Jan. 01, 1990 | ~ |
| not | Dec. 21, 1995 | Feb. 24, 1996 |
| employed | Jan. 01, 1990 | ~ |
| by | Jan. 01, 1990 | Dec. 20, 1995 |
|  | Feb. 25, 1996 | ~ |
| Firm A | Jan. 01, 1990 | Dec. 20, 1995 |
| Firm B | Feb. 25, 1996 | Mar. 20, 1998 |
| & | Jan. 20, 1998 | Mar. 20, 1998 |
| Firm C | Jan. 20, 1998 | ~ |

Now if one looks how the text is present at different periods, one can see that:

1. The text will appear as of Jan. 1, 1990: I am employed by firm A.
2. The text will appear as of Jan. 1, 1996: I am not employed.
3. The text will appear as of Jan. 1, 1990: I am employed by firm A & firm B.

The behavior of the employment dimension values is as follows:

| Value | 01/90 | 02/90 | 12/95 | 01/96 | 02/96 | 03/96 | 12/97 | 01/98 | 02/98 | 03/98 | 04/98 |
|---|---|---|---|---|---|---|---|---|---|---|---|
| Firm A | ++++ + | ++++ + | +++ |  |  |  |  |  |  |  |  |
| Firm B |  |  |  |  |  | + | ++++ + | ++++ + | ++++ + | ++++ + | +++ |
| Firm C |  |  |  |  |  |  |  |  | ++++ + | ++++ + | ++++ + |

As clearly shown, there is no value in the period of 21/12/1995 until 25/02/1996, and there is multi-value in the period between 20/10/1998 until 20/03/1998.

With this example, the idea that a dimension need not necessarily have a valid value at all times is demonstrated.

Those versed in the art will readily appreciate that there are multiple manners of displaying text of interest, and three out of many possible variants are discussed below.

1. Define a requested value (value range) dimension of a text segment. If, for example, a dimension of time in an updated law text is sought, the law in force at any requested date X will be displayed. The retrieval program, based on the input values, will automatically choose all text segments that correspond to the criterion of: expiration_date=X, and only the requested segment(s) will be displayed.

2. Display text chances according to different values of the same dimension. If all changes made in a selected passage of text during the period Y are of interest, the display program will automatically select all segments concerning the chosen text and display them e.g. as a set of windows, a separate window for each segment. It is, thus, possible to see the modification of the information along the selected dimension (in this case, the dimension of time). When the dimension is time, it is possible to view the modifications in a synchronized display and examine the changes made on a specific date throughout the text. Alternatively, it is possible to select a diachronic display and see all the alterations made to a certain segment of the text within a given range of dates. Other variants are of course, applicable.

3. A complete visual display. In this case, the text will be marked with a different color for each period of validity. For example: a word valid from Jan. 1, 1990, will be printed in color A (the color assigned to the date Jan. 1, 1990). A word valid from Jan. 1, 1991 will be printed in color B (the color assigned to the date Jan. 1, 1991). If a word colored in A expires on Jan. 1, 1991, it will be marked with an overstrike in color B (the color chosen for the date Jan. 1, 1991). By following this technique, the reader will be able to determine the date on which each word became valid, and the date on which it ceased to be valid. By viewing the text which is not marked with an overstrike the reader will be able to read the full text as at the date of the last update.

As previously mentioned, no hitherto known technique is capable of conferring additional layering information to a text (e.g. in a simple text file format), utilizing basically, although not necessarily, standard word processing functions.

The invention enables the recording of text and the provision of text dimensions with various values. According to these values, it is possible to define text derivatives, and dynamically display them according to user demand.

According to the invention, it is possible to review various layers and dimensions that reside in the text.

The invention is by no means bound by any specific implementation for accomplishing text layers and retrieving information from the multi-layer text. Thus, by way of example, if two adjacent text segments have the same value, the system may automatically form the two segments into one segment having a common value. By way of another example, the invention is not bound by any given user-interface that serves for establishing multi-layer text or for accomplishing text retrieval.

One, non limiting, example of realizing a time dimension is given below, (where date values reside between the /* ... */ signs, and wherein B stands for starting date and E stands for ending date:

/*B01.07.1976-E01.01.9999*/ small business entity— "business entity" which does not employ more than two employees and its turnover in all business does not exceed 350,000/*B01.07.1976-E01.08.1979*/ LIRA'S 200.000/B0.08.1979-E01.04.1983*/
/*B01.04.1983-E01.01.1987*/800,000/*B01.08.1979-E0 1.01.1987*/ SHEKEL /*B01.01.1987-E01.08.19.88*/50,000
/*B01.08.1988-E01.04.1989*/60,000/*B01.04.1989-E01.01.1990*/70,000
/*B01.01.1990-E01.01.1991*/85,000
/*B01.01.1991-E01.10.1991*/100,000
/*B01.10.1991-E01.01.1993*/120,000
/*B01.01.1993-E01.01.1994*/130,000
/*B01.01.1994-E01.01.1995*/150,000
/*B01.01.1995-E01.01.1996*/170,000
/*B01.01.1996-E01.01.9999*/185,000/*B01.01.1987-E01.01.9999*/NEW SHEKEL/*B01.07.1976-E01.01.9999*/, The specified example is parsed to the following information (presented as a table)

| The relevant text | Effective to | Effective from |
|---|---|---|
| small business entity - "business entity which does not employ more than two employees and its turnover in all business does not exceed | 1.1.9999 | 1.7.1976 |

-continued

| The relevant text | Effective to | Effective from |
|---|---|---|
| 350,000 | 1.8.1979 | 1.7.1976 |
| LIRA'S | 1.8.1979 | 1.7.1976 |
| 200,000 | 1.4.1983 | 1.8.1979 |
| 800,000 | 1.1.1987 | 1.4.1983 |
| SHEKEL | 1.1.1987 | 1.8.1979 |
| 50,000 | 1.8.1988 | 1.1.1987 |
| 60,000 | 1.4.1989 | 1.8.1988 |
| 70,000 | 1.1.1990 | 1.4.1989 |
| 85,000 | 1.1.1991 | 1.1.1990 |
| 100,000 | 1.10.1991 | 1.1.1991 |
| 120,000 | 1.1.1993 | 1.10.1991 |
| 130,000 | 1.1.1994 | 1.1.1993 |
| 150,000 | 1.1.1995 | 1.1.1994 |
| 170,000 | 1.1.1996 | 1.1.1995 |
| 185,000 | 1.1.9999 | 1.1.1996 |
| NEW SHEKEL | 1.1.9999 | 1.1.1987 |

The updated text for 1.1.1998, reads as follows:

small business entity—"business entity" which does not employ more than two employees and its turnover in all business does not exceed 185,000 new shekels.

It should be noted that the order of steps recited in the claims is provided for convenience of explanation only and should by no means be regarded as binding.

The present invention has been described with a certain degree of particularity but it should be understood that various modifications and alterations may be made without departing from the scope of the invention as defined by the following claims:

The invention claimed is:

1. A computer-implemented method for producing a multi-layer text, comprising:
    (a) providing a text;
    (b) selecting a text segment;
    (c) assigning a value of a text dimension to said text segment, wherein a text dimension refers to any desired domain and includes information on one related text layer;
    (d) repeating steps (b) and (c) as many times as desired.

2. The method of claim 1, wherein said text dimension is selected from the group that includes time, place, spokesperson and reference.

3. The method according to claim 1, further comprising the step of displaying said multi-layer text, such that different values of a text dimension are displayed in unique manner.

4. The method according to claim 3 wherein each one of said values is displayed in a different color.

5. The method according to claim 1, wherein said values are assigned to said text segment using at least one of the following functions: INSERT, END, AUTHOR CORRECTION.

6. A memory medium containing a file that includes a multi-layer text generated according to the method of claim 1.

7. For use with a multi-layer text, the multi-layer text having text segments assigned with values of text dimensions, wherein a text dimension refers to any desired domain and includes information on one related text layer; a computer-implemented method for displaying a text of interest, comprising:
    (a) providing at least one input value, or input value range, of at least one text dimension; and (b) retrieving and displaying text segments having assigned thereto a value that meets said input value or input value range.

8. The method of claim 7, wherein said text dimension is selected from the group that includes time, place, spokesperson and reference.

9. The method of claim 7, wherein said retrieval includes displaying a requested value or value range of a text dimension of a text segment.

10. The method of claim 7, wherein said retrieval includes displaying text changes according to different values of the same text dimension.

11. The method of claim 7, wherein said retrieval includes a complete visual display.

12. A system that includes a display unit for producing multi-layer text, comprising:
   (i) a selector for selecting a text segment in said text;
   (ii) an assignor for assigning a value of a text dimension to said text segment, wherein a text dimension refers to any desired domain and includes information on one related text layer; and
   (iii) a memory for storing the multi-layer text.

13. The system of claim 12, wherein said text dimension is selected from the group that includes time, place, spokesperson, reference.

14. The system of claim 12, wherein said display unit is capable of displaying said multi-layer text, such that different values of a text dimension are displayed in a unique manner.

15. The system according to claim 14, wherein each one of said values is displayed in a different color.

16. The system of claim 12, wherein said values are assigned to said text segment using at least one of the following functions: INSERT, END, AUTHOR CORRECTION.

17. For use with a multi-layer text having text segments assigned with values of text dimensions wherein a text dimension refers to any desired domain and includes information on one related text layer, a system for displaying a text of interest, comprising:
   i. a receiver for receiving at least one input value or input value range of at least one text dimension; and
   ii. a retriever for retrieving and displaying text segments having assigned thereto a value that meets said input value or input value range.

18. The system of claim 17, wherein said text dimension is selected from the group that includes time, place, spokesperson and reference.

19. The system of claim 17, wherein said retrieval includes displaying a requested value, or value range of a dimension of a text segment.

20. The system of claim 17, wherein said retrieval includes displaying text changes according different values of the same dimension.

21. The system of claim 17, wherein said retrieval includes a complete visual display.

* * * * *